United States Patent [19]

Jenkins

[11] Patent Number: 4,457,981

[45] Date of Patent: Jul. 3, 1984

[54] COMPOSITE LABEL WEB ROLLS AND METHOD OF MAKING SAME

[75] Inventor: William A. Jenkins, Dayton, Ohio

[73] Assignee: Monarch Marking Systems, Inc., Dayton, Ohio

[21] Appl. No.: 158,543

[22] Filed: Jun. 11, 1980

[51] Int. Cl.$^3$ .......... B32B 1/00

[52] U.S. Cl. .......... 428/41; 156/291; 156/344

[58] Field of Search .......... 427/208.6, 286; 428/202, 40–42; 156/291

[56] References Cited

U.S. PATENT DOCUMENTS

| | | | |
|---|---|---|---|
| 2,089,525 | 8/1937 | Abrams et al. | 427/286 |
| 3,741,786 | 6/1973 | Torrey | 428/202 X |
| 4,188,427 | 2/1980 | Grass | 428/41 |
| 4,214,024 | 7/1980 | Jacobson | 428/202 X |

*Primary Examiner*—David A. Simmons

*Attorney, Agent, or Firm*—Joseph J. Grass

[57] ABSTRACT

There is disclosed a plurality of composite label web rolls and a method of making and using same. The web roll is comprised of a carrier web on which a series of labels are releasably held by a coating of pressure sensitive adhesive. The composite web rolls are made by slitting a wide composite web roll. The slitting is done without regard to the pattern of the adhesive coating. There is further disclosed a method by which the same or substantially identical hand-held labelers can be used to dispense labels of different widths, wherein the composite label webs exhibit the same drag. In this way the forces required to manually actuate the labeler or labelers are kept to a minimum and are substantially equal.

9 Claims, 5 Drawing Figures

COMPOSITE LABEL WEB ROLLS AND METHOD OF MAKING SAME

BACKGROUND OF THE INVENTION

1. Field of the Invention

This invention relates to the art of composite label webs and the method of making and using same.

2. Brief Description of the Prior Art

It is known in the prior art to use the same hand-held labeler to dispense labels of different widths. This is disclosed in U.S. Pat. No. 4,191,608 to Bussard and Jenkins granted Mar. 4, 1980. It is also known to design hand-held labelers in such a way that a labeler can, with slight modification, be made to dispense labels of different widths. Thus, two or more labelers can be constructed using many common parts and relatively few different parts to accommodate labels with different widths. Such labelers are typically manually operated to print a label and store energy in a return spring and thereafter the return spring causes a driver to advance the carrier web to dispense a label at a delaminator. The stronger the return spring, the greater the manual force required to actuate the labeler. There is more drag in a labeler that has to dispense a wide label having a continuous coating than in a labeler that has to dispense a narrow label having a continuous coating of the same thickness mainly because the force required to strip or delaminate such wide labels from a carrier web is greater than the force required to strip or delaminate such narrow labels from a carrier web. Therefore, a labeler that is used to dispense both wide and narrow labels must have a return spring strong enough to dispense the widest labels, and as such the return spring is greater than would be required if the labeler were only required to dispense narrow labels.

Prior art U.S. Pat. Nos. 2,095,437 to Fox granted Oct. 12, 1937, 2,303,346 to Flood granted Dec. 1, 1942, and 2,636,297 to Johnson granted Apr. 28, 1953 each disclose composite label webs having a pattern coating of pressure sensitive adhesive in which the adhesive coating patterns have a definite relationship or registry to the side edges of the label. Although the above Fox and Johnson patents have feed cuts in the form of holes formed between the side edges of the composite label web, the feed cuts can also take the form of slits or knife cuts as shown in U.S. Pat. No. 3,783,083 to Jenkins granted Jan. 1, 1974. In the Fox and Johnson patents, when laminating the label material web to the carrier web care must be taken to assure that the adhesive coating pattern is in proper registry with the feed cuts.

SUMMARY OF THE INVENTION

The invention relates to an improved method of making composite web rolls, to label web rolls per se, and to a labeling method. By using the composite label web roll according to the invention, the same labeler or substantially similar labeler can be used to feed label webs having labels of different widths. Moreover, the labeler can have a relatively small return spring as would be necessary for a labeler designed to feed a composite web of narrow labels. This improvement is facilitated by providing substantially the same amount of adhesive on a wide label as on a narrow label. Thus the peeling or stripping force required to separate the wide labels is substantially the same as for the narrow labels. In accordance with a specific embodiment, the narrow labels are provided with a continuous or "full gum" coating of adhesive and the wide labels are provided with a substantially uniform pattern coating of adhesive with substantially the same composition and amount of adhesive. More specifically, the pattern coating is comprised of a plurality of spaced stripes or zones of adhesive and intervening adhesive-free zones. The zones of adhesive are illustrated to be parallel to each other and to extend in the longitudinal direction. The zones of adhesive on the wide, pattern-coated labels are equal in thickness or height to each other and to the adhesive on the narrow, full gum coated labels. If desired, the narrow labels can also have a pattern coating of adhesive so long as the narrow and wide labels have the same amount of adhesive. When manufacturing composite label web rolls having a pattern coating, in accordance with the invention the coating process can occur without regard to the location of the adhesive zones. The coating operation is performed on a composite label web which is much wider than the composite label web which is used in the labeler. The relatively wide composite web is slit into a plurality of narrower label webs. While the slitting takes place, the marginal side edges of the relatively wide composite web are trimmed. This is all without regard to the location of the adhesive zones. The feed cuts are used to determine the location of the slitting knives without regard to the adhesive zones. In this way there is not need to compromise the position of the side edges of the label webs with respect to the adhesive zones. The result is that precision manufacturing of label webs suited for hand-held labelers is more easily accomplished.

DETAILED DESCRIPTION OF THE PREFERRED EMBODIMENT

Figure 1:
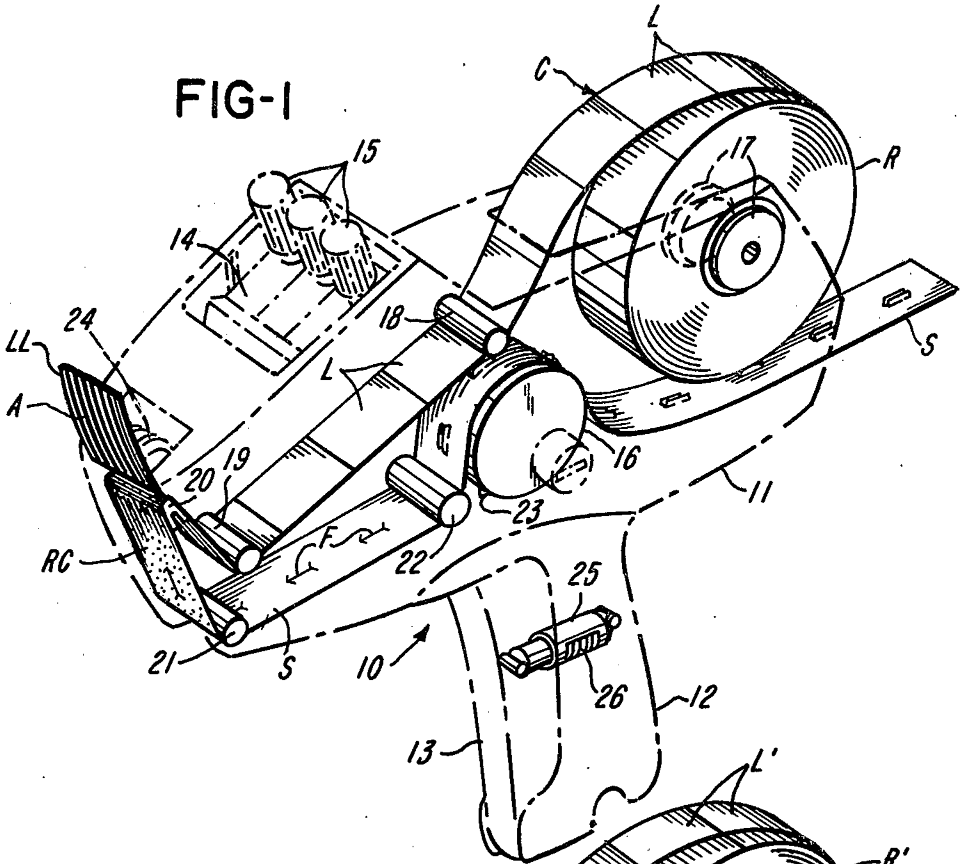
FIG. 1 is a mainly perspective phantom view of a labeler shown using a web of wide labels.

With reference to FIG. 1, there is shown a labeler 10 of a type shown in U.S. Pat. No. 4,166,747 to Hamisch, Jr. granted Sept. 26, 1978, showing details of construction, the disclosure of this patent being incorporated herein by reference. The labeler 10 has a frame or housing 11 with a handle 12. An actuator 13 disposed at the handle 12 is used to actuate a print head 14 into printing cooperation with a platen (not shown) to print on a label L. The print head 14 is shown to be a three-line print head with three setting knobs 15. The labels L and a supporting or carrier web S comprise a composite web C. The labels L are wide and are releasably held to the carrier web S by a pressure sensitive adhesive A in contact with a release coating RC on the adjacent surface of the carrier web S. The composite web C is arranged in a roll R as shown. The composite web C is paid out of the roll R by a driver illustrated to be a feed wheel 16. A label L is printed when the actuator 13 is operated and the feed wheel 16 is thereafter driven by a spring assembly 25 having a return spring 26. The roll is rotatably mounted on spaced rotatable hub members 17. The composite web extends from the roll into cooperation with a brake roll 18, to and partially around a guide roller 19, to and about a peel roller or peel edge 20, to and partially about a guide roller 21, to and partially about a roller 22, and into engagement with the feed wheel 16. The supporting web S has longitudinally spaced feed cuts F disposed in the carrier web S with which spaced teeth 23 on the feed wheel 16 engage. The leading label LL has been bent clockwise slightly from its positon beneath an applicator 24 to show the pattern coating of adhesive A.

Figure 2:
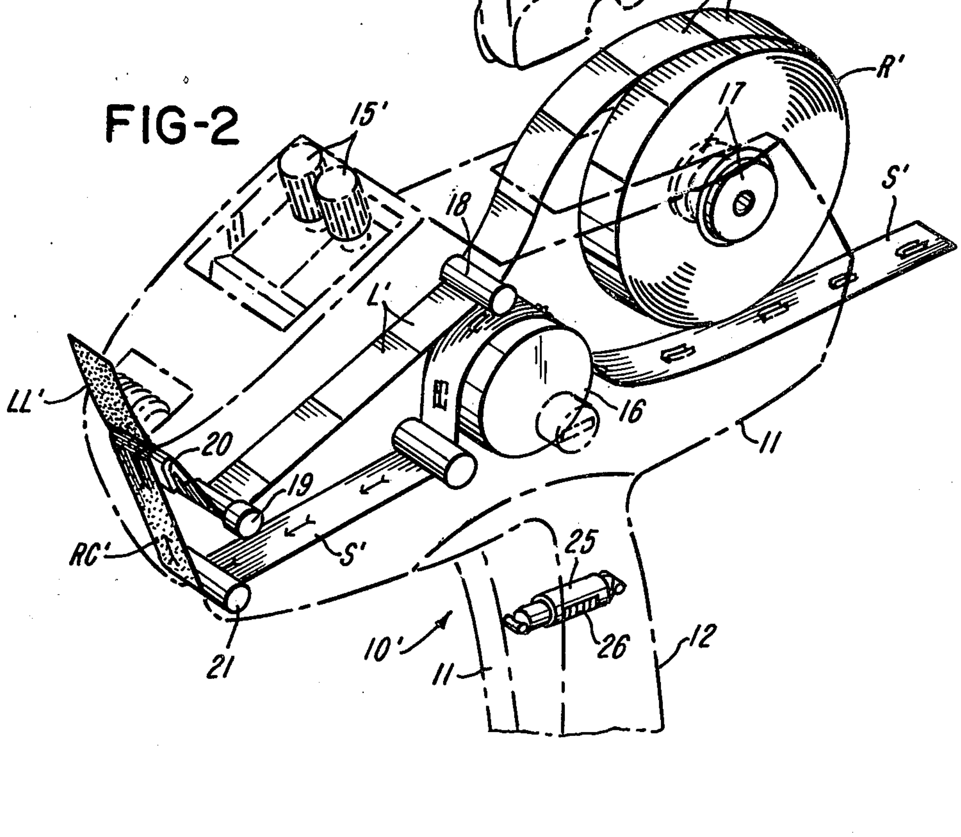
FIG. 2 is a view similar to FIG. 1 but showing a web of narrow labels.

The same reference characters are used for labeler 10' in FIG. 2 which is identical to the labeler of FIG. 1. except as indicated. Like components are indicated with the same reference character as in FIG. 1. The labeler 10' has hub members 17 which are spaced more closely than hub members 17 in FIG. 1 because the label roll R' is narrower. Guide roller 19 is shouldered to accommodate the narrow composite web C' with narrow labels L' and a narrow carrier web S'. The labels L' are shown to have a full gum coating of adhesive as indicated at A'. The leading label LL' has been bent clockwise to show the full gum coating. A "full gum" coating is a coating of uniform thickness across the entire label as shown. The pattern gum or part gum coating indicated at A has the same thickness and area and hence the same resistance to stripping as the full gum coating indicated at A'. Thus, the amount of energy needed to dispense a label LL is substantially the same as the amount of energy needed to dispense a label LL'. Thus, the return spring 26 in the labeler 10 can be the same size as the spring 26 in the labeler 10'. But for the invention, the spring 26 in the labeler 10 would have to be larger than the spring 26 in the labeler 10' because if the label LL were of the full gum type a larger amount of energy would be required to accomplish label stripping. Accordingly, the spring size in the labeler 10 can be kept to a minimum. This means there will be less operator fatigue because less energy will be required to actuate the labeler 10 that would otherwise be required.

Figure 3:
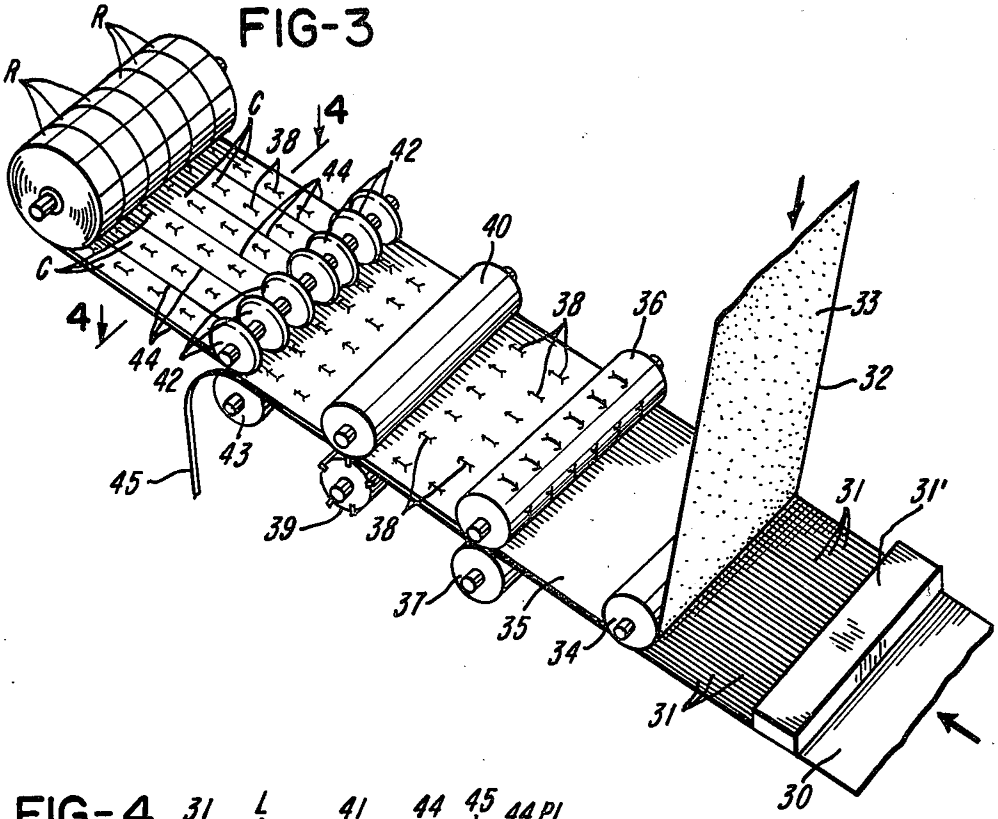
FIG. 3 is a perspective diagrammatic view showing how label rolls according to the invention are made.
Figure 4:
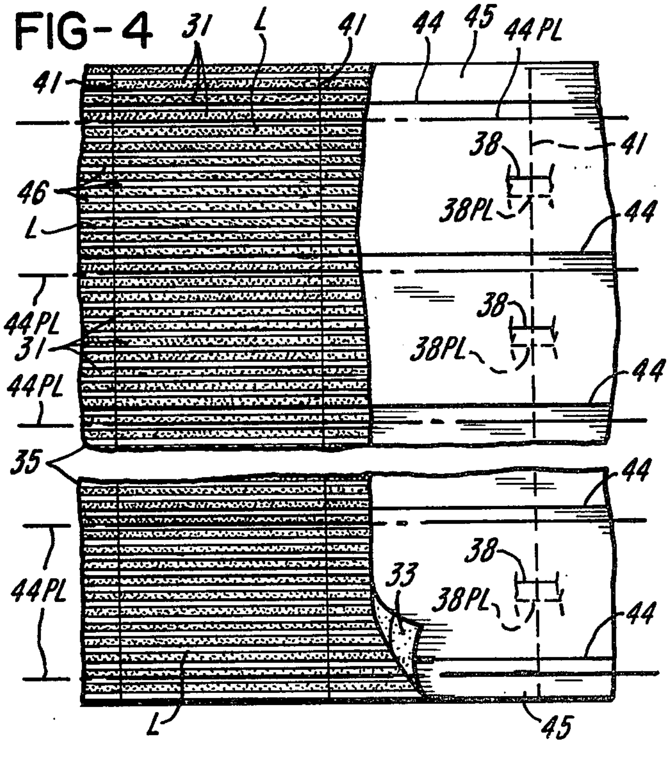
FIG. 4 is a bottom plan of a wide composite web taken generally along line 4—4 of FIG. 3 but showing the trim at the side edges.
Figure 5:
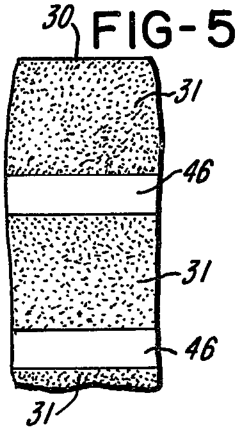
FIG. 5 is an enlarged fragmentary view showing the pattern coating on the label.

With reference now to FIGS. 3 through 5, there is diagrammatically illustrated how the pattern gum coated composite web of the invention is made. A wide web of label material 30 is passed into cooperation with a coating head 31' which applies a plurality of spaced stripes or zones of adhesive 31 to the underside of the label material web 30. The pattern coated web 30 is laminated to a supporting or carrier web 32 of supporting material having a release coating 33. The carrier web 32 is shown to pass around a roll 34 and from there the resultant composite web 35 is passed between a cutter 36 and a back-up roll 37. The cutter 36 makes feed cuts in the carrier web 32 as indicated at 38. The composite web 35 also passes between a cutter 39 and a back-up roll 40 which sever the label web 30 transversely along lines 41 (FIG. 4) to provide butt cuts without severing the carrier web 32. The rolls 39 and 40 can be located ahead or upstream of the rolls 36 and 37, if desired. Nevertheless, the transverse cuts 41 are shown to be registered with the feed cuts 38. The composite web 35 next passes into cooperation with slitters 42 and cooperating roll 43. The slitters 42 are lined up with respect to the feed cuts 38 but no regard is made to the location at which the slitter knives 42 slit the patterned adhesive coating. The slitter knives 42 slit the composite web 35 along lines 44. The outermost knives 42 cut trim 45 from both sides of the composite web 35 as shown. Thereafter, the resultant narrow composite webs C are wound into individual rolls R as shown in FIG. 3. The rolls R are suitable for and are the same as the rolls shown in FIGS. 1 and 2.

As best shown in FIGS. 4 and 5, the adhesive zones 31 are spaced apart by adhesive-free zones 46. The cuts 44 are random with respect to the pattern of the adhesive 31. In the illustrated embodiment, adjacent cuts 44 are equally spaced from the intervening feed cuts 38. Thus, when slitting the web 35, the operator can concentrate on aligning the slitters 42 with respect to the feed cuts 38 and can ignore completely the location or orientation of the pattern coating which comprises the adhesive strips 31 and intervening nonadhesive zones 46. If the feed cuts 38 were at the position shown by phantom lines 38PL, then the slitters would be adjusted to make cuts along lines 44PL. It should be noticed that the lines 44PL extend through the pattern at a different location, but this does not affect the amount of adhesive in contact with the carrier web 32 because the labels L are still the same size.

Although the pattern shown in FIGS. 1, 3, 4 and 5 comprises straight adhesive stripes, any random but substantially uniform pattern can be used.

In the embodiment illustrated in FIGS. 3, 4 and 5, the random coating is comprised of adhesive stripes 31 of constant and equal width and height. The adhesive-free zones are also of equal width. The stripes 31 extend longitudinally of the composite web 35 as shown. By way of example, not limitation, the adhesive strip 31 is three times wider than the adhesive-free zone 46. The label is one inch wide and each stripe is 0.075 inch wide and each adhesive-free zone is 0.025 inch wide. Thus, there are ten adhesive zones or stripes or the equivalent 31 and 10 adhesive-free zones or equivalent 46 on each label. In another embodiment (not shown) there are five adhesive stripes and five adhesive-free zones and the label is one inch wide. Each adhesive zone is 0.15 inch wide and each adhesive-free zone is 0.05 inch wide. The amount of adhesive is the same for this particular label as on a three-quarter inch wide label having a full gum coating of the same thickness. Thus both the one inch label and the three-quarter inch label have the same resistance to peeling and thus present the same drag in the labeler. It is to be understood that labels of other and different widths can be made so long as the relationship of equal amounts of adhesive remains the same.

Other embodiments and modifications of this invention will suggest themselves to those skilled in the art, and all such of these as come within the spirit of this invention are included within its scope as best defined by the appended claims.

I claim:

1. Method of making label rolls for use in hand-held labelers of the same basic construction, comprising the steps of: providing a relatively wide first label material web and a relatively wide release-coated first carrier web, applying a first coating of pressure sensitive adhesive to one side of the first label material web, laminating the first label material web and the first carrier web with the first coating being adhered to the release-coating first carrier web to form a first composite web, providing a relatively wide second label material web and a relatively wide release-coated second carrier web, applying a second coating of pressure sensitive adhesive to one side of the second label material web, the second coating having generally the same degree of adhesion as the first coating but the ratio of adhesive to adhesive-free label material surface across the width of the second label material web being less than the ratio of adhesive to adhesive-free label material surface across the width of the first label material web, laminating the second label material web and the second carrier web with the second coating being adhered to the release-coated second carrier web to form a second composite web, cutting the first label material web laterally at longitudinally spaced intervals and thereafter slitting the first composite web into a series of relatively narrow composite label strips having a series of first labels, winding the first label strips into first label rolls, cutting the second label material web laterally at longitudinally spaced intervals and thereafter slitting the second composite web into a series of relatively narrow second composite label strips having a series of second labels, winding the second labels strips into second label rolls, and the total width of the adhesive applied across the width of the first and second labels being substantially equal for requiring substantially the same amount of stripping force to delaminate the first labels as is required to delaminate the second labels.

2. Method of making label rolls for use in hand-held labelers of the same basic construction, comprising the steps of: providing a relatively wide first label material web and a relatively wide release-coated first carrier web, applying a first continuous coating of pressure sensitive adhesive to one side of the first label material web, laminating the first label material web and the first carrier web with the first coating being adhered to the release-coated first carrier web to form a first composite web, providing a relatively wide second label material web and a relatively wide release-coated second carrier web, applying a second coating of pressure sensitive adhesive to one side of the second label material web, the second coating being comprised of a plurality of laterally spaced longitudinally extending zones of adhesive, the second coating having generally the same degree of adhesion as the first coating but the ratio of adhesive to adhesive-free label material surface across the width of the second label material web being less than the ratio of adhesive to adhesive-free label material surface across the width of the first label material web, laminating the second label material web and the second carrier web with the second coating being adhered to the release-coated second carrier web to a second composite web, cutting the first label material web laterally at longitudinally spaced intervals and thereafter slitting the first composite web into a series of relatively narrow composite label strips having a series of first labels, winding the first label strips into first label rolls, cutting the second label material web laterally at longitudinally spaced intervals and thereafter slitting the second composite web into a series of relatively narrow second composite label strips having a series of second labels, winding the second label strips into second label rolls, and the total width of the adhesive applied across the width of the first and second labels being substantially equal for requiring substantially the same amount of stripping force to delaminate the first labels as is required to delaminate the second labels.

3. Method of making label rolls for use in hand-held labelers of the same basic construction, comprising the steps of: providing a relatively wide first label material web and a relatively wide release-coated first carrier web, applying a first continuous coating of pressure sensitive adhesive to one side of the first label material web, laminating the first label material web and the first carrier web with the first coating being adhered to the release-coated first carrier web to form a first composite web, providing a relatively wide second label material web and a relatively wide release-coated second carrier web, applying a second coating of pressure sensitive adhesive to one side of the second label material web, the second coating being comprised of a plurality of laterally spaced longitudinally extending zones of adhesive, the second coating having generally the same degree of adhesion as the first coating, laminating the second label material web and the second carrier web with the second coating being adhered to the release-coated second carrier web to form a second composite web, cutting the first label material web laterally at longitudinally spaced intervals and thereafter slitting the first composite web into a series of relatively narrow composite label strips having a series of first labels, winding the first label strips into first label rolls, cutting the second label material web laterally at longitudinally spaced intervals and thereafter slitting the second composite web into a series of relatively narrow second composite label strips having a series of second labels, winding the second label strips into second label rolls, wherein the first labels are about 0.75 inch wide, wherein the second labels are about one inch wide, and the combined widths of the zones of adhesive on the second labels is about 0.75 inch for requiring substantially the same amount of stripping force to delaminate the first labels as is required to delaminate the second labels.

4. Method of making label rolls for use in hand-held labelers of the same basic construction, comprising the steps of: providing a relatively wide first label material web and a relatively wide release-coated first carrier web, applying a first coating of pressure sensitive adhesive to one side of the first label material web, laminating the first label material web and the first carrier web with the first coating being adhered to the release-coated first carrier web to form a first composite web, providing a relatively wide second label material web and a relatively wide release-coated second carrier web, applying a second coating of pressure sensitive adhesive to one side of the second label material web, the second coating being of the same composition as the first coating but the ratio of adhesive to adhesive-free label material surface across the width of the second label material web being less than the ratio of adhesive to adhesive-free label material surface across the width of the first label material web, laminating the second label material web and the second carrier web with the second coating being adhered to the release-coated second carrier web to form a second composite web, cutting the first label material web laterally at longitudinally spaced intervals and thereafter slitting the first composite web into a series of relatively narrow composite label strips having a series of first labels, winding the first label strips into first label rolls, cutting the second label material web laterally at longitudinally spaced intervals and thereafter slitting the second composite web into a series of relatively narrow second composite label strips having a series of second labels, winding the second label strips into second label rolls, and the total width of the adhesive applied across the width of the first and second labels being substantially equal for requiring substantially the same amount of stripping force to delaminate the first labels as is required to delaminate the second labels.

5. Method of making label rolls for use in hand-held labelers of the same basic construction, comprising the step of: providing a relatively wide first label material web and a relatively wide release-coated first carrier web, applying a first coating of pressure sensitive adhesive to one side of the first label material web, laminating the first label material web and the first carrier web with the first coating being adhered to the release-coated first carrier web to form a first composite web, providing a relatively wide second label material web and a relatively wide release-coated second carrier web, applying a second coating of pressure sensitive adhesive to one side of the second label material web, the second coating of adhesive having generally the same degree of adhesion as the first coating but the ratio of adhesive to adhesive-free label material surface across the width of the second label material web being less than the ratio of adhesive to adhesive-free label material surface across the width of the first label material web, laminating the second label material web and the second carrier web with the second coating being adhered to the release-coated second carrier web to form a second composite web, cutting the first label material web laterally at longitudinally spaced intervals and thereafter slitting the first composite web into a series of relatively narrow composite label strips having a series of first labels, winding the first label strips into first label rolls, cutting the second label material web laterally at longitudinally spaced intervals and thereafter slitting, without regard to the location of the adhesive on the second labels, the second composite web into series of relatively narrow second composite label strips having a series of second labels, winding the second label strips into the second label rolls, and the total width of the adhesive applied across the width of the first and second labels being substantially equal for requiring substantially the same amount of stripping force to delaminate the first labels as is required to delaminate the second labels.

6. A set of label rolls of different widths for use in hand-held labelers of the same basic construction, comprising: a first label roll having a first carrier web and a series of first labels releasably adhered by a first coating of pressure sensitive adhesive to the first carrier web, a second label roll having a second carrier web and a series of second labels releasably adhered by a second coating of pressure sensitive adhesive to the second carrier web, the second labels being wider than the first labels, the second coating having generally the same degree of adhesion as the first coating but the ratio of adhesive to adhesive-free label surface across the width of the second labels being less than the ratio of adhesive to adhesive-free label surface across the width of the first labels, and the total width of the adhesive across a said first label being substantially equal to the total width of the adhesive across a said second label for requiring substantially the same amount of stripping force to delaminate the first labels as to delaminate the second labels.

7. A set of label rolls of different widths for use in hand-held labelers of the same basic construction, comprising: a first label roll having a first carrier web and a series of first labels releasably adhered by a first continuous coating of pressure sensitive adhesive to the first carrier web, a second label roll having a second carrier web and a series of second labels releasably adhered by a second coating of pressure sensitive adhesive to the second carrier web, the second coating being comprised of a plurality of laterally spaced longitudinally extending zones of adhesive, the second labels being wider than the first labels, the second coating having generally the same degree of adhesion as the first coating but the ratio of adhesive to adhesive-free label surface across the width of the second labels being less than the ratio of adhesive to adhesive-free label surface across the width of the first labels, and the total width of the adhesive across a said first label being substantially equal to the total width of the adhesive across a said second label for requiring substantially the same amount of stripping force to delaminate the first labels as to deliminate the second labels.

8. A set of label rolls of different widths for use in hand-held labelers of the same basic construction, comprising: a first label roll having a first carrier web and a series of first labels releasably adhered by a first continuous coating of pressure sensitive adhesive to the first carrier web, a second label roll having a second carrier web and a series of second labels releasably adhered by a second coating of pressure sensitive adhesive to the second carrier web, the second coating being comprised of a plurality of laterally spaced longitudinally extending zones of adhesive, the second labels being wider than the first labels, the second coating having generally the same degree of adhesion as the first coating, wherein the first labels are about 0.75 inch wide, wherein the second labels are about one inch wide, and the combined widths of the zones of adhesive on the second labels is about 0.75 inch for requiring substantially the same amount of stripping force to delaminate the first labels as to delaminate the second labels.

9. A set of label rolls of different widths for use in hand-held labelers of the same basic construction, comprising: a first label roll having a first carrier web and a series of first labels releasably adhered by a first coating of pressure sensitive adhesive to the first carrier web, a second label roll having a second carrier web and a series of second labels releasably adhered by a second coating of pressure sensitive adhesive to the second carrier web, the second labels being wider than the first labels, the second coating being of the same composition as the first coating but the ratio of adhesive to adhesive-free label surface across the width of the second labels being less than the ratio of adhesive to adhesive-free label surface across the width of the first labels, and the total width of the adhesive across a said first label being substantially equal to the total width of the adhesive across a said second label for requiring substantially the same amount of stripping force to delaminate the first labels as to delaminate the second labels.

* * * * *

UNITED STATES PATENT AND TRADEMARK OFFICE

CERTIFICATE OF CORRECTION

PATENT NO. : 4,457,981

DATED : July 3, 1984

INVENTOR(S) : William A. Jenkins

It is certified that error appears in the above-identified patent and that said Letters Patent are hereby corrected as shown below:

Column 2, line 27, "not" should be --no--. Column 3, line 14, after "Fig. 1" the period --.-- should be deleted. Column 4, line 14, "nonadhesive" should be --non-adhesive--. Column 5, line 46, after "to" --form-- has been omitted. Column 7, line 31, after "into" --a-- has been omitted; line 33, "the" (second occurrence) should be omitted.

Signed and Sealed this

*Nineteenth* Day of *March 1985*

[SEAL]

*Attest:*

DONALD J. QUIGG

*Attesting Officer* *Acting Commissioner of Patents and Trademarks*